W. H. JAHNS.
PISTON RING.
APPLICATION FILED MAY 10, 1915.
1,386,873.
Patented Aug. 9, 1921.
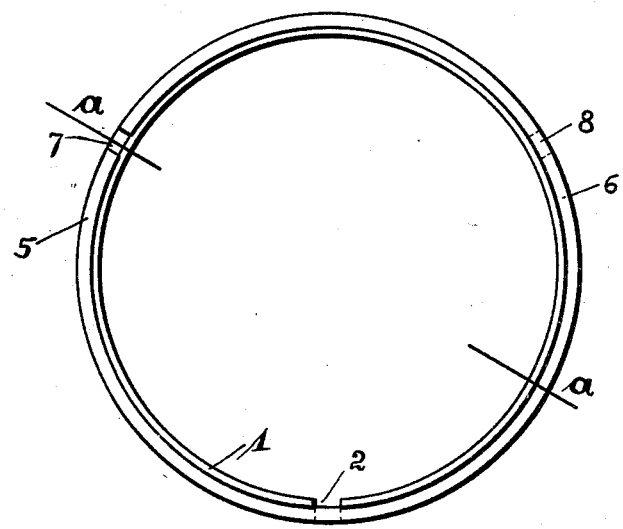
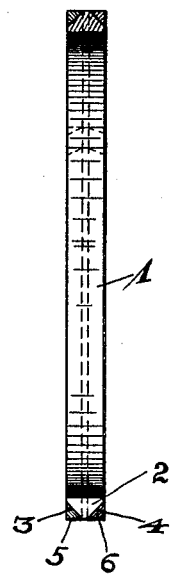
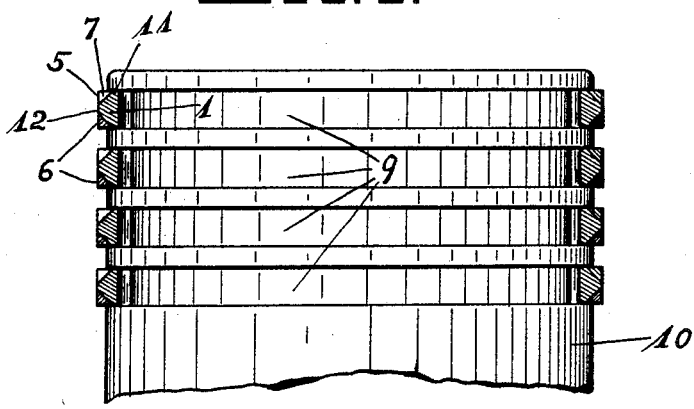
Witnesses:
Inventor:
William H. Jahns

UNITED STATES PATENT OFFICE.

WILLIAM H. JAHNS, OF LOS ANGELES, CALIFORNIA.

PISTON-RING.

1,386,873. Specification of Letters Patent. Patented Aug. 9, 1921.

Application filed May 10, 1915. Serial No. 27,253.

*To all whom it may concern:*

Be it known that I, WILLIAM H. JAHNS, a citizen of the United States, residing at Los Angeles, in the county of Los Angeles and State of California, have invented new and useful Improvements in Piston-Rings, of which the following is a specification.

My invention relates to piston rings which are adapted to be applied to and fitted into the usual peripheral grooves of the pistons for the purpose of packing the clearance space between the outer periphery of the piston and the inner surface of the cylinder. An object of this invention is to provide a packing composed of a set of resilient rings for each of the grooves in the piston which may be so placed in position in the grooves of the piston that a perfectly tight joint may be established and maintained at all times and under all conditions when the piston is in operation. Other objects may appear in the detailed description.

Referring to the drawings, in which similar characters of reference indicate the same parts throughout the several views, Figure 1 is a plan of the assembled rings; Fig. 2 is a sectional view of the same; and Fig. 3 is an elevation of the piston with the several sets of rings shown in section thereon.

The central and inner ring 1 of each set is adapted to be inserted in and loosely fits the grooves 9 of the piston 10 and these rings are cut at 2 so that they may be readily extended sufficiently to clear the outer periphery of the piston and moved thereover into position in the grooves 9. The inner periphery of the rings 1 is flattened to conform to the bottom of the grooves 9 and the outer surface is beveled on each side at 3 and 4 to receive the outer rings 5 and 6 which are of triangular cross section and the rings 5 and 6 are cut at 7 and 8, respectively, so that they may be extended and slipped over the piston 10 and the rings 1.

The cuts 2, 7 and 8 in the rings 1, 5 and 6 are so arranged with respect to each other, as shown in Fig. 1, that a continuous packing will be formed around the entire periphery of the piston, as for instance, the space between the ends of the ring 1 at the point of contact with the wall of the cylinder will be covered by the outer rings 5 and 6, and the space between the ends of the rings 5 and 6 will be similarly covered by the inner ring 1.

The tapered or beveled edges 3 and 4 of the ring 1 being of the same angularity as the beveled edges 11 of the outer rings 5 and 6, and the outer surfaces of the rings 5 and 6 being parallel with the surface 12 of the ring 1, a flat surface of the entire width of the grooves 9 is thus presented for contact with the wall of the cylinder at all times. The inner ring 1 serves as a means for spreading the outer rings 5 and 6 transversely across the face of the inner ring for a distance corresponding to the width of the grooves 9 and also serves to maintain the outer rings extended outwardly from the periphery of the piston 10 for making resilient contact with the walls of the cylinder.

It is obvious that the angularity of the beveled edges of the rings 1, 5 and 6 may be altered to suit conditions but the form shown is preferable for general use.

Having thus described my invention, what I claim as new and desire Letters Patent for, is:—

1. In combination with a piston having a groove, a continuous spring expander ring of comparatively stiff metal mounted in said groove and of a width to fill the opening of the groove, said ring having outer inclined faces, outer triangular metallic packing rings each having an inclined face fitting a face of the expander ring, each of said outer rings being of thin cross section and less in thickness than the expander ring.

2. In combination with a piston having a groove, a spring expander ring seated in said groove and spaced from the inner wall thereof and having inclined outer faces, a pair of outer metallic packing rings triangular in form and fitting said expander ring faces, said outer rings being of thin cross section and yieldable at local points on short segments to conform to the wall of the cylinder and said expander being thicker than the outer rings and extending farther into the groove than the outer rings at all points of its circumferences.

In testimony whereof I hereunto affix my signature in the presence of two witnesses.

WILLIAM H. JAHNS.

Witnesses:
 JOHN L. MALTMAN,
 WM. J. CLARK.